(12) United States Patent
Stephenson

(10) Patent No.: US 9,310,491 B2
(45) Date of Patent: Apr. 12, 2016

(54) SCINTILLATOR WITH TAPERED GEOMETRY FOR RADIATION DETECTORS

(71) Applicant: Schlumberger Technology Corporation, Sugar Land, TX (US)

(72) Inventor: Kenneth Stephenson, Plainsboro, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 550 days.

(21) Appl. No.: 13/629,307

(22) Filed: Sep. 27, 2012

(65) Prior Publication Data

US 2014/0084150 A1    Mar. 27, 2014

(51) Int. Cl.
*G01T 1/20*    (2006.01)
*G01V 5/04*    (2006.01)

(52) U.S. Cl.
CPC ... *G01T 1/20* (2013.01); *G01V 5/04* (2013.01); *Y10T 29/49826* (2015.01)

(58) Field of Classification Search
CPC .......... G01T 1/202; G01T 1/178; G01V 5/04; G01V 5/12
See application file for complete search history.

(56) References Cited

U.S. PATENT DOCUMENTS

| | | | |
|---|---|---|---|
| 2,411,802 A | 11/1946 | Olin et al. | |
| 4,647,781 A | 3/1987 | Takagi et al. | |
| 5,083,026 A * | 1/1992 | Elbaum | 250/369 |
| 5,753,918 A | 5/1998 | Pandelisev | |
| 6,473,486 B2 | 10/2002 | Hoffman | |
| 8,173,953 B2 | 5/2012 | Stoller et al. | |
| 2003/0138067 A1 | 7/2003 | Tiller et al. | |
| 2010/0223010 A1* | 9/2010 | Nikitin et al. | 702/8 |
| 2010/0327153 A1* | 12/2010 | Molz | 250/256 |
| 2011/0198504 A1* | 8/2011 | Eigen | G01T 1/2985 250/362 |

FOREIGN PATENT DOCUMENTS

| | | |
|---|---|---|
| RU | 2414724 C2 | 3/2011 |
| WO | 2011008469 A2 | 1/2011 |
| WO | 2012058569 A2 | 5/2012 |

OTHER PUBLICATIONS

International Search Report and the Written Opinion for International Application No. PCT/US2013/062274 dated Jan. 30, 2014.

* cited by examiner

*Primary Examiner* — Casey Bryant
(74) *Attorney, Agent, or Firm* — Michael Dae

(57) ABSTRACT

A radiation detector may include a housing, and a scintillator body carried within the housing and including a proximal portion defining a proximal end, a distal portion defining a distal end, and a medial portion between the proximal portion and the distal portion. The scintillator body may have a constant diameter along the proximal portion, and a decreasing diameter along the distal portion from the medial portion to the distal end. The radiation detector may further include a photodetector coupled to the distal end of the scintillator body.

18 Claims, 6 Drawing Sheets

SCINTILLATOR WITH TAPERED GEOMETRY FOR RADIATION DETECTORS

BACKGROUND

Radiation detectors, such as gamma-ray detectors, for example, may include a scintillator material which converts a given type of radiation (e.g., gamma-rays) into light. The light is directed to a photodetector, which converts the light generated by the scintillator into an electrical signal, which may be used to measure the amount of radiation which is incident on the crystal.

In the case of well-logging tools for hydrocarbon wells (e.g., gas and oil wells), a borehole gamma-ray detector may be incorporated into the tool string to measure radiation from the geological formation surrounding the borehole to determine information about the geological formation, including the location of gas and oil pockets. It is generally desirable to have as large a scintillator volume as possible within the constraints of the wellbore diameter while, at the same time, extracting as much light as possible from the scintillator to the photodetector for each gamma-ray interaction. Yet, given the space constraints in well-logging tools, achieving desired scintillator dimensions and operating characteristics may be difficult in some applications.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A radiation detector may include a housing, and a scintillator body carried within the housing and including a proximal portion defining a proximal end, a distal portion defining a distal end, and a medial portion between the proximal portion and the distal portion. The scintillator body may have a constant diameter along the proximal portion, and a decreasing diameter along the distal portion from the medial portion to the distal end. The radiation detector may further include a photodetector coupled to the distal end of the scintillator body.

A related well-logging tool may include a sonde housing, a radiation generator carried by the sonde housing, and at least one radiation detector carried by the sonde housing, such as the radiation detector described briefly above.

A related scintillator body may include a proximal portion defining a proximal end, a distal portion defining a distal end, and a medial portion between the proximal portion and the distal portion. The proximal portion may have a constant diameter along a length thereof, and the distal portion may have a decreasing diameter along a length thereof from the medial portion to the distal end.

A related method is for making a radiation detector which may include positioning a scintillator body within a housing, where the scintillator body includes a proximal portion defining a proximal end, a distal portion defining a distal end, and a medial portion between the proximal portion and the distal portion. The scintillator body may have a constant diameter along the proximal portion, and a decreasing diameter along the distal portion from the medial portion to the distal end. The method may further include coupling a photodetector to the distal end of the scintillator body.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime and multiple prime notation are used to indicate similar elements in different embodiments.

Figure 1:
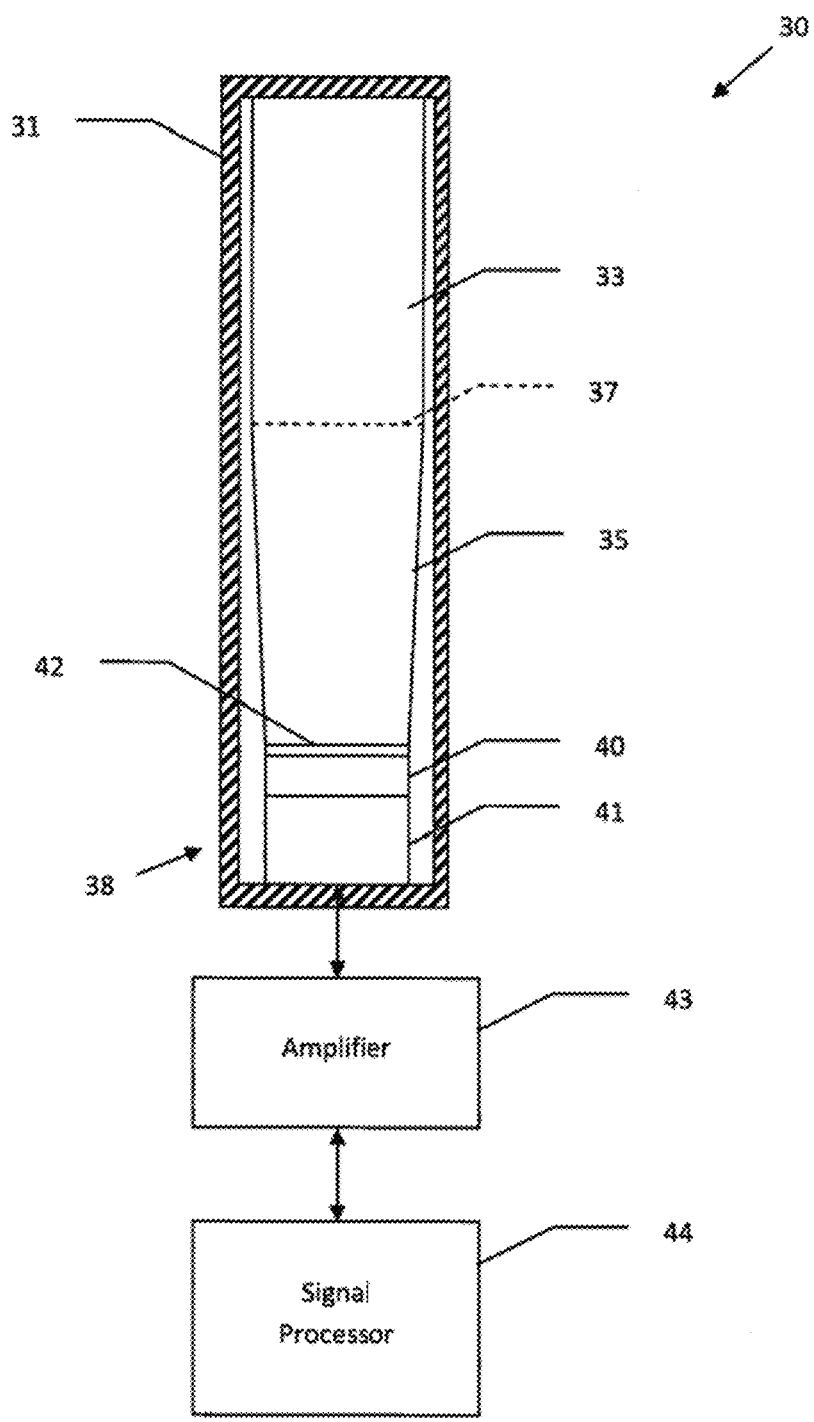
FIG. 1 is a schematic block diagram of a radiation detector in accordance with an example embodiment.
Figure 2:
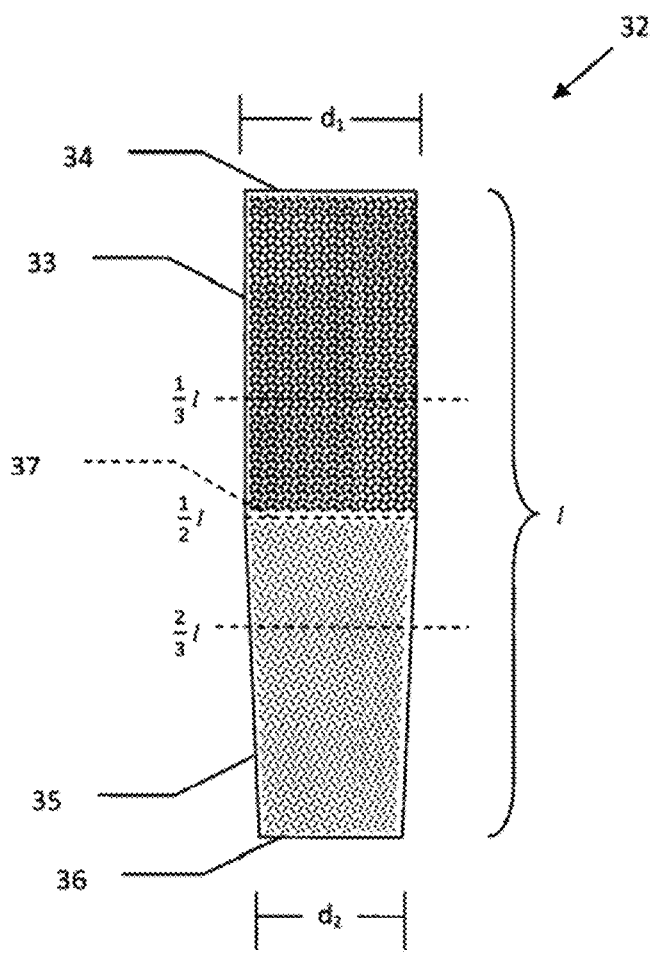
FIG. 2 is a side view illustrating the scintillator body of the radiation detector of FIG. 1 in greater detail.

Referring initially to FIGS. 1 and 2, radiation detector 30 is first described. The radiation detector 30 illustratively includes a detector housing 31, which in the illustrated example is cylindrical, such as for use in a well-logging tool, as will be described further below. The detector housing 31 may comprise a metal (e.g., aluminum, etc.) which allows gamma rays to pass through. A scintillator body 32 is carried within the detector housing 31 and illustratively includes a proximal portion 33 defining a proximal end 34, a distal portion 35 defining a distal end 36, and a medial portion 37 between the proximal portion and the distal portion. The radiation detector 30 further illustratively includes a photodetector 38 coupled to the distal end 36 of the scintillator body 32 and carried within the detector housing. In the illustrated example, the photodetector 38 includes a photomultiplier window 40 coupled to the distal end 36 of the scintillator body via an optional optical coupler 42 (e.g., a silicon pad, etc.), and a photocathode 41 on the interior surface of the photomultiplier window. However, other suitable photodetector configurations may be used in different embodiments, such as an avalanche photodiode (APD) configuration, for example.

In the case of gamma-rays, when charged particles pass through the detector housing 31 and strike the scintillator body 32, energy deposited by the gamma-rays is converted into light and received by the photodetector 38. The photodetector 38 converts the light from the scintillator body 32 into an electrical signal. The electrical signal ma be amplified by an amplifier(s) 43, which may provide an amplified signal to a signal processor or processing circuitry 44. The signal processor 44 may include a general or special-purpose processor, such as a microprocessor or field programmable gate array, and associated memory, and may perform a spectroscopic analysis of the electrical signal, for example. A reflector material (not shown) may surround the scintillator body 32 to help prevent light from escaping except via the photomultiplier window 40.

Various types of scintillator materials may be used depending upon the given application. Example scintillator materials may include: gadolinium oxyorthosilicate (GSO), $YAlO_3$ (YAP), LuYAP, $LaCl_3$(Ce) (lanthanum chloride doped with Cerium), $LaBr_3$(Co) (Cerium-doped lanthanum bromide), bismuth germanate (BGO), NaI(Tl), LuAG, YAG, LuAP, $SrI_2$, GAGG/GYGaGG, $CeBr_3$, $GdI_2$, $LuI_2$, ceramic scintillators, GPS, LPS, BaBrI, LuAG ceramic, LiCaF, CLYC, CLLB, CLLC, etc. It should be noted that while the embodiments herein are described with reference to gamma-ray detection, the various configurations and method aspects discussed herein may also be used for other types of radiation detectors as well.

By way of background, with respect to gamma-ray detectors, it may be desirable that gamma-rays of equal energy that interact in different parts of the scintillator body 32 transfer the same amount of light to the photodetector 38. Low light levels and non-uniform light collection from different parts of the scintillator body 32 may both reduce the gamma-ray energy resolution of the photodetector 38. In the case of oilfield logging tools, an external pressure housing is used (e.g., a sonde housing with a high strength steel) to isolate the instrumentation from the high pressure environment of the borehole. The diameter of a gamma-ray scintillator is accordingly constrained by the internal diameter of the sonde housing.

Figure 6:
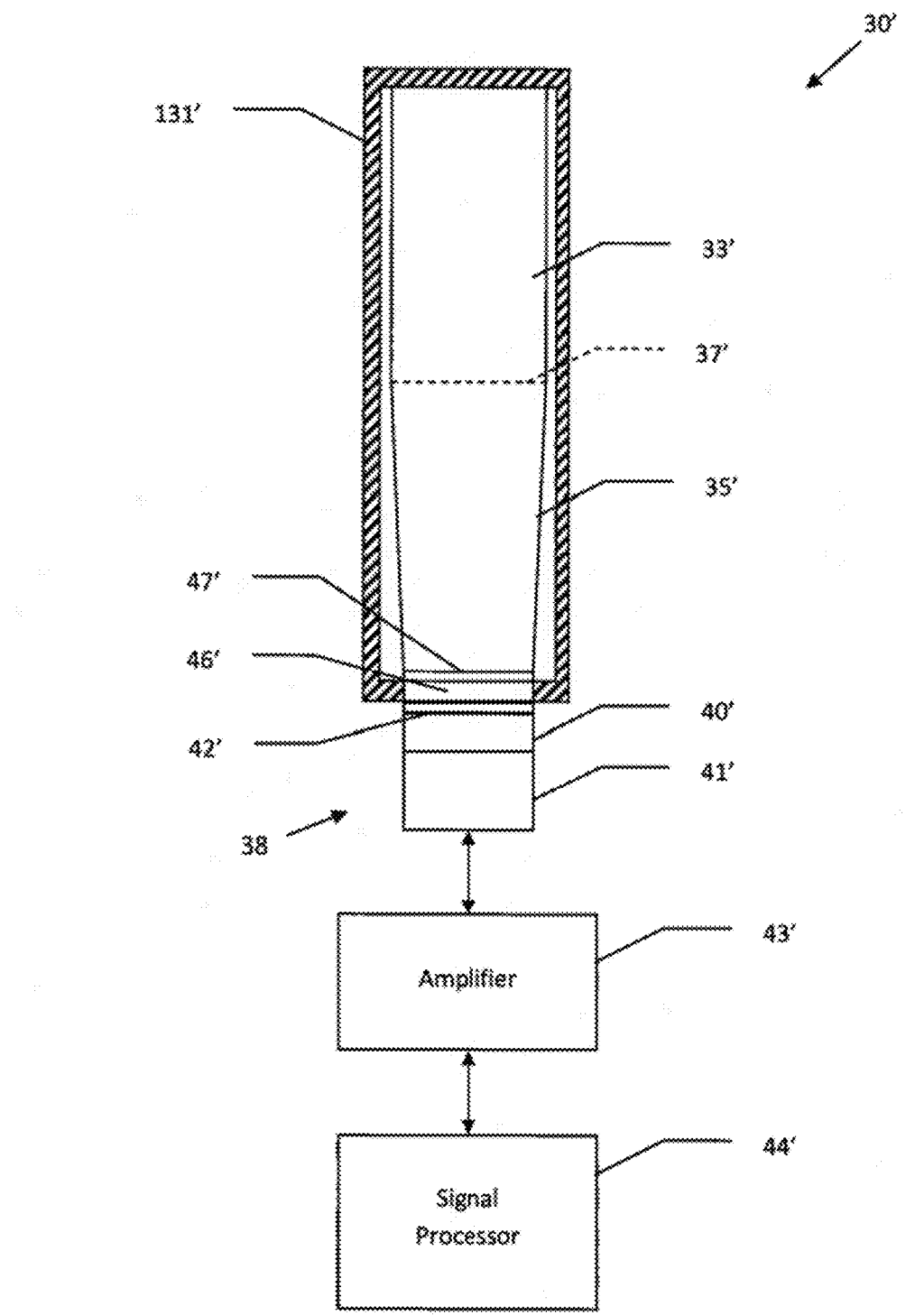
FIG. 6 is a schematic block diagram of another embodiment of the radiation detector of FIG. 1.

The size of the photocathode 41 will also be similarly constrained within a well logging tool, and may have a diameter that is smaller than that of the detector, or in the case of a packaged (hygroscopic) scintillator (FIG. 6), an exit window 46' in a scintillator housing 131'. In the case of a hygroscopic scintillator, the scintillator housing 131' may be contained inside the detector housing (not shown in FIG. 6) to provide additional protection for the scintillator body from the ambient atmosphere, and in particular from moisture. Generally speaking, light coupling from a cylindrical end of a scintillator to a photomultiplier cathode (as shown in FIG. 1) or an exit window 46' of the scintillator housing 131' (as shown in FIG. 6), which are both of a smaller diameter, may be relatively poor. This is because some light exits the scintillator through the end area that is not covered by the photocathode. In the example detector 30' illustrated in FIG. 6, an additional optical coupling pad 47' is positioned between the distal end of the distal portion 35' and the exit window 46'. Example hygroscopic scintillators may include as NaI(Tl), $LaCl_3$:Ce, $LaBr_3$:Ce, etc.

The scintillator body 32 helps alleviate this problem by tapering part of the scintillator toward the photocathode 41 so that the diameter of the scintillator body at the distal end 36 is the same or very close to that of the photocathode and photomultiplier window 40. Considered in other terms, the scintillator body 32 has a constant diameter along the proximal portion 33, and a decreasing diameter along the distal portion 35 from the medial portion 37 to the distal end 36. That is, the distal portion 35 of the scintillator body 32 has a cone-shaped taper which terminates or truncates in a flat bottom (i.e., the distal end 36), which provides improved optical coupling between the scintillator body 32 and the photodetector 38.

The shape of the scintillator body 32 helps to provide a surface area for gamma ray interaction along the proximal portion 33, which has a first diameter $d_1$, that approaches the cylindrical volume of the detector housing 31 in the same location, and gradually tapers along the distal portion 35 so that a second diameter $d_2$ of the distal end 36 corresponds with the diameter of the photomultiplier window 40 to provide desired optical matching. As shown in FIG. 2, an example range for the location of the medial portion 37 may be from about one-third to two thirds of the length I of the scintillator body 32, although the medial portion may be outside this range in some embodiments. This may help to provide a balance between increased cross-sectional area for the proximal portion 33, and sufficient tapering of the distal portion 35 so that the diameter of the distal end 36 corresponds with the diameter of the photocathode 41. The medial portion 37 may be considered the transition line between the proximal portion 33 and the distal portion 35. In the illustrated example, the medial portion 37 is the midline between the proximal 34 end and the distal end 36.

In some embodiments, the proximal portion 33 and/or the distal portion 35 may be roughened along the exterior surfaces thereof to provide improved uniformity in light collection. In the example illustrated in FIG. 3, the proximal portion 33 has a greater surface roughness than the distal portion 35, which is illustratively indicated by the darker and lighter stippling, respectively. Moreover, different roughening angles may be used for surface roughening on different portions of the scintillator body 32, as will be discussed further below.

Figure 3:
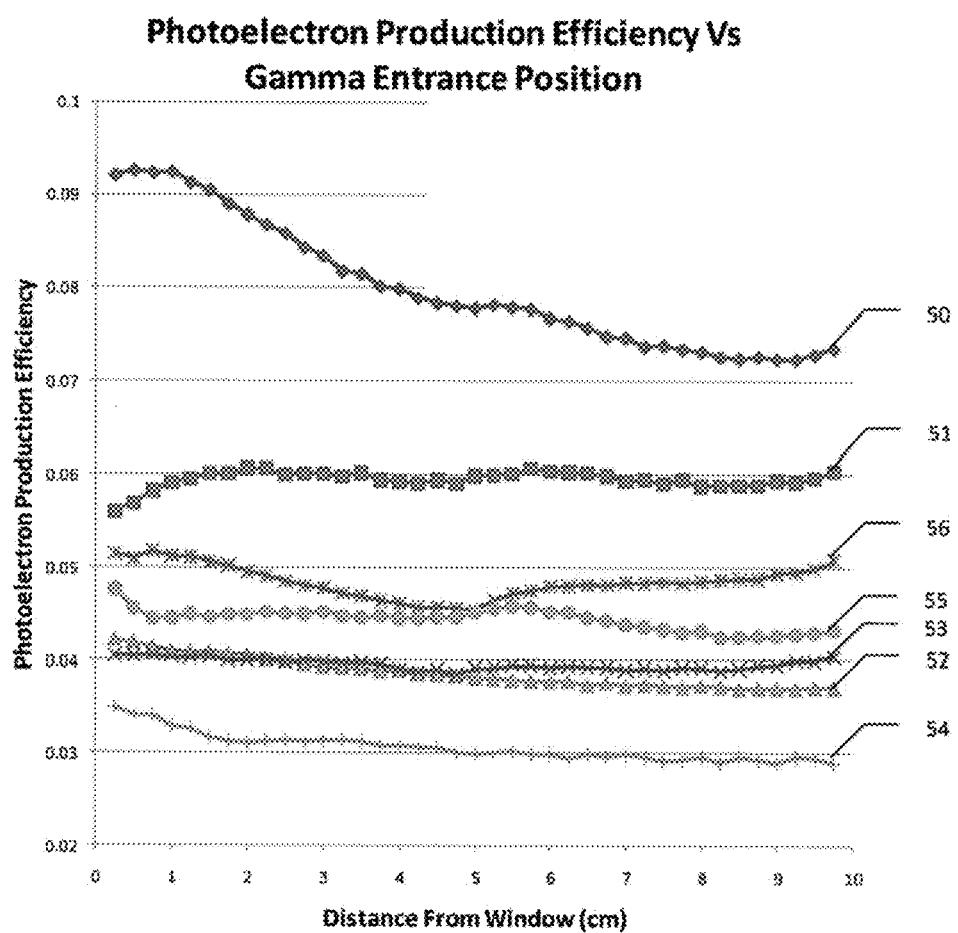
FIG. 3 is a graph of simulated photoelectron production efficiency versus gamma entrance position for a scintillator body as shown in FIG. 2 and for other scintillator body shapes.

The foregoing will be further understood with reference to FIG. 3, in which simulated photoelectron production efficiency versus gamma entrance position for the scintillator body 32 shown in FIG. 2, and for various other scintillator configurations, is shown. To study the tradeoffs in scintillator volume against light output and uniformity, a Monte Carlo computer program was used. The program, SLitrani[1], directs gamma-rays into the detector model at different axial positions along the scintillator and follows optical photons produced by Compton scattering and photoelectric absorption of the gamma-rays. The optical photons may scatter from surfaces, be absorbed in the scintillator or the surrounding media, or be transmitted to the photomultiplier cathode. The surface of the scintillator may be roughened by specifying an average deviation angle of the surface from normal flatness. A variable surface angle prevents light from becoming trapped in the scintillator by total internal reflection. In the calculations, the optical absorption characteristics of $YAlO_3$ ("YAP") are used.

For purposes of comparison, a first scintillator model was used in which a cylindrical scintillator had a constant diameter of 1" along the entire 4" length thereof, with photomultiplier cathode of the same diameter. In a first example represented by plot line 50, a proximal portion of this scintillator had surface scratches with a roughening angle Thetadep1 at 35°, and a distal portion with surface scratches with a roughening angle at 21.5°. In the model, the normal to the surface at the point hit by the photon is randomly tilted (with respect to the true normal of the surface) by an angle $\theta$ which is generated randomly according to a distribution $\sin\theta d\theta\phi$, where $\theta$ varies between 0 and Thetadep1. A plot line 51 represents the same scintillator configuration as that associated with plot line 50, with the exception that an optical coupling pad was included between the scintillator body and the photomultiplier window. Furthermore, a plot line 52 represents the same scintillator structure as that associated with the plot line 51, with the exception that it had a polished surface without surface roughening).

Still another configuration that was modeled is similar to the one associated with the plot line 51, with the exception that the diameter of the cylindrical scintillator body was larger than that of the photomultiplier cathode (i.e., 1.2" vs. 1"), and the efficiency of this configuration is represented by a plot line 53. Yet another comparison structure having an efficiency represented by a plot line 54 was similar to that associated with the plot line 53, with the exception that it had a polished surface. A final comparison structure, which has an efficiency represented by a plot line 55, was similar to the configuration associated with the plot line 53, with the exception that the distal end of the scintillator immediately adjacent the photomultiplier cathode was beveled from the larger diameter (i.e., 1.2") down to the photomultiplier cathode diameter (i.e., 1") at a 45° angle. Moreover, this structure had a roughening angle at 80' along the proximal portion, 25° along the distal portion, and 25' along the bevel. Finally, a plot line 56 represents the efficiency of the scintillator body 32 with a roughening angle of 35° along the proximal portion 33, and 21.5' along the distal (i.e., tapered from 1.2" to 1") portion 35.

It will be appreciated that the highest light output and most uniform output is obtained when the diameter of the scintillator is the same as the photocathode, (plot line 50) (or, in the case of a packaged (hygroscopic) scintillator, the exit window). In the simulation represented by plot line 50, a coupling pad was not included and thus the reflection from interfaces in the coupling pad and window are not accounted for, but this is not particularly practical, and also it results in non-uniform light collection from different parts of the scintillator. The results with the reflection turned on are seen in plot line 51.

The next best efficiency results are provided by the scintillator body 32 (plot line 56), which has a relatively small loss of light of approximately a 10% compared to the above-noted "matched" diameter geometry. However, the scintillator body 32 also has a greater scintillator volume than the above-noted matched diameter embodiments. The geometry of the scintillator body 32 accordingly helps to optimize the volume of the scintillator, while also producing a uniform, high light output response that is relatively close to the matched diameter case.

With respect to the embodiments shown in FIGS. 1 and 6, the change in diameter or taper along the distal ends is illustrated as being linear. However, it should be noted that the taper does not have to be linear in all embodiments. For example, other shapes of the transition, such as a concave or convex taper, may also be used.

The increased volume away from the photocathode 41 may be particularly useful when the detector 30 is oriented in a well-logging tool such that the large diameter end is toward the gamma-ray source. Since there are more gamma-rays incident on the scintillator body 32 closer to the source than farther away from the source, this places the large volume part of the detector in the desired position.

Figure 4:
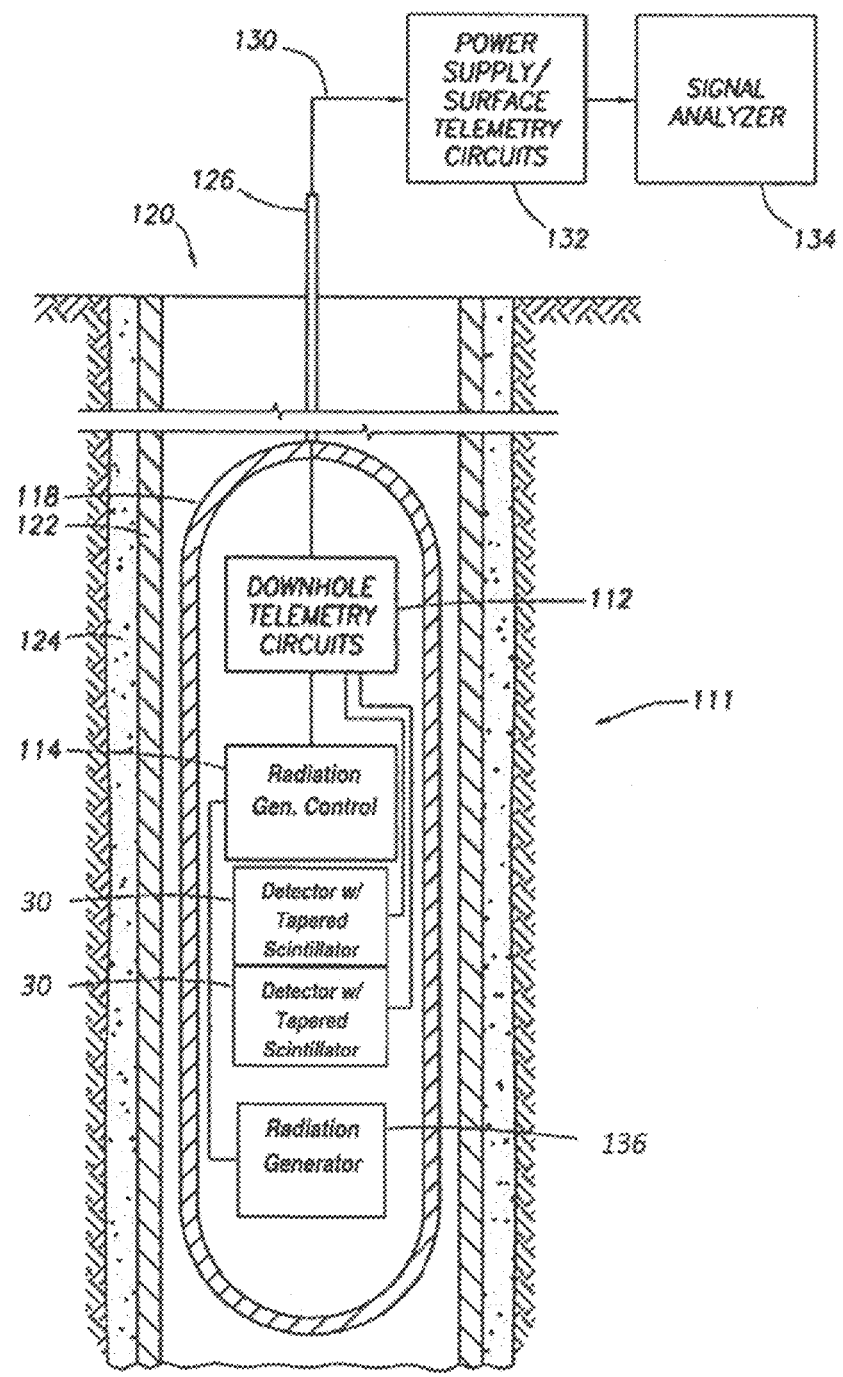
FIG. 4 is a schematic block diagram of a well-logging tool in which the radiation detector of FIG. 1 may be used.

Turning now to FIG. 4, an example embodiment of a well-logging tool in which one or more detectors 30 (similar to those described above) may be used. The detectors 30 are positioned within a sonde housing 118 along with a radiation generator 136 (e.g., Gamma-ray generator, etc.) and associated high voltage electrical components (e.g., power supply). Supporting control circuitry 114 for the radiation generator 136 (e.g., low voltage control components) and other components, such as downhole telemetry circuitry 112, may also be carried in the sonde housing 118.

The sonde housing 118 is to be moved through a borehole 120. In the illustrated example, the borehole 120 is lined with a steel casing 122 and a surrounding cement annulus 124, although the sonde housing and radiation generator 136 may be used with other borehole configurations (e.g., open holes). By way of example, the sonde housing 118 may be suspended in the borehole 120 by a cable 126, although a coiled tubing, etc., may also be used. Furthermore, other modes of conveyance of the sonde housing 118 within the borehole 120 may be used, such as wireline, slickline, Tough Logging Conditions (TLC) systems, and logging while drilling (LWD), for example. The sonde housing 118 may also be deployed for extended or permanent monitoring in some applications.

A multi-conductor power supply cable 130 may be carried by the cable 126 to provide electrical power from the surface (from power supply circuitry 132) downhole to the sonde housing 118 and the electrical components therein the downhole telemetry circuitry 112, low-voltage radiation generator support circuitry 114, and one or more of the above-described radiation detectors 30). However, in other configurations power may be supplied by batteries and/or a downhole power generator, for example.

The radiation generator 136 is operated to emit neutrons to irradiate the geological formation adjacent the sonde housing 118. Photons (i.e., gamma-rays) that return from the formation are detected by the radiation detectors 30. The outputs of the radiation detectors 30 may be communicated to the surface via the downhole telemetry circuitry 112 and the surface telemetry circuitry 132, which may be analyzed by a signal analyzer 134 to obtain information regarding the geological formation. By way of example, the signal analyzer 134 may be implemented by a computer system executing signal analysis software for obtaining information regarding the formation. More particularly, oil, gas, water and other elements of the geological formation have distinctive radiation signatures that permit identification of these elements. Signal analysis can also be carried out downhole within the sonde housing 118 in some embodiments.

Figure 5:
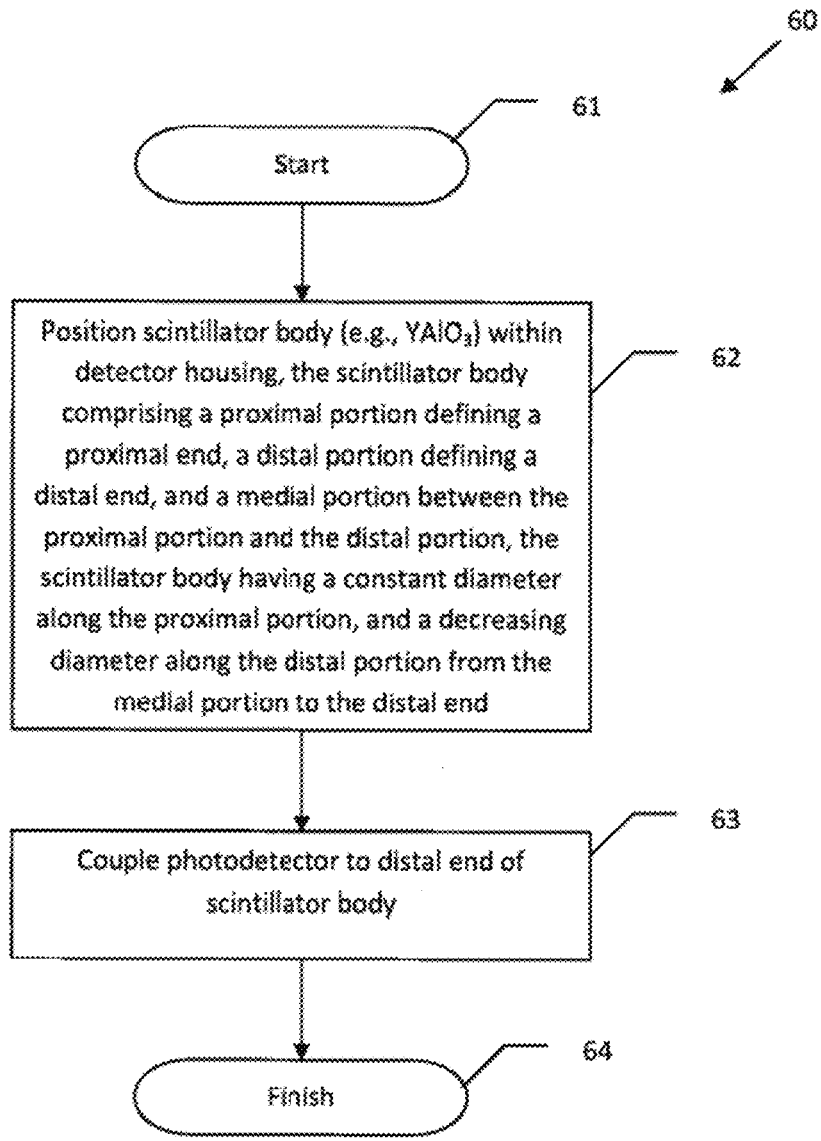
FIG. 5 is a flow diagram illustrating method aspects associated with waking the radiation detector of FIG. 1.

A related method for making a radiation detector 30 is now described with reference to flow diagram 60 of FIG. 5. Beginning at Block 61, the method includes positioning the scintillator body 32 within a detector housing 31, at Block 62. Furthermore, the photodetector 38 is coupled to the distal end of the scintillator body 36, at Block 63, as described further above, which illustratively concludes the method illustrated in FIG. 5 (Block 641).

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A radiation detector comprising:
a housing;
a scintillator body carried within said housing and comprising a proximal portion defining a proximal end, a distal portion defining a distal end, and a medial portion between said proximal portion and said distal portion; said scintillator body having a constant diameter along the proximal portion, and a decreasing diameter along said distal portion from said medial portion to the distal end; and
a photodetector coupled to the distal end of said scintillator body,
wherein said scintillator body has a greater surface roughness adjacent the proximal end than adjacent the distal end.

2. The radiation detector of claim 1 wherein said medial portion is located at least one-third of a length between the proximal end and the distal end of said scintillator body.

3. The radiation detector of claim 1 wherein said medial portion is located at least one-half of a length between the proximal end and the distal end of said scintillator body.

4. The radiation detector of claim 1 wherein the proximal end has a first diameter and the distal end has a second diameter smaller than the first diameter; and wherein said distal portion decreases in diameter from said medial portion to the distal end so that the second diameter corresponds with a diameter of said photodetector.

5. The radiation detector of claim 1 wherein said housing comprises a cylindrical housing.

6. The radiation detector of claim 1 further comprising an optical coupler positioned between said photodetector and said scintillator body.

7. The radiation detector of claim 1 wherein said photodetector comprises:
a photomultiplier window coupled to the distal end of said scintillator body; and
a photocathode coupled to said photomultiplier window.

8. The radiation detector of claim 1 further comprising:
an amplifier coupled to said photodetector; and
a signal processor coupled with said photodetector to detect an electrical signal from said photodetector.

9. The radiation detector of claim 1 wherein said scintillator body comprises YAlO3 (YAP).

10. The radiation detector of claim 1 wherein the surface adjacent the proximal has a different roughening angle from that of the distal end.

11. The radiation detector of claim 1 wherein the surface adjacent the proximal has a greater roughening angle than that of the distal end.

12. The radiation detector of claim 1 wherein the surface adjacent the proximal has a roughening angle of about 35° to 80° and the surface adjacent the distal end has a roughening angle of about 21.5° to 25°.

13. A scintillator body comprising:
a proximal portion defining a proximal end, a distal portion defining a distal end, and a medial portion between said proximal portion and said distal portion;
said proximal portion having a constant diameter along a length thereof, and said distal portion having a decreasing diameter along a length thereof from said medial portion to the distal end,
wherein said scintillator body has a greater surface roughness adjacent the proximal end than adjacent the distal end.

14. The scintillator body of claim 13 wherein the medial portion is located at least one-third of a length between the proximal end and the distal end of said scintillator body.

15. The scintillator body of claim 13 wherein said medial portion is located at least one-half of a length between the proximal end and the distal end of said scintillator body.

16. The scintillator body of claim 13 wherein the surface adjacent the proximal has a different roughening angle from that of the distal end.

17. The scintillator body of claim 13 wherein the surface adjacent the proximal has a greater roughening angle than that of the distal end.

18. The scintillator body of claim 13 wherein the surface adjacent the proximal has a roughening angle of about 35° to 80° and the surface adjacent the distal end has a roughening angle of about 21.5° to 25°.

* * * * *